(12) United States Patent
Lorenz et al.

(10) Patent No.: US 8,874,682 B2
(45) Date of Patent: Oct. 28, 2014

(54) COMPOSITE GRAPH CACHE MANAGEMENT

(75) Inventors: Brian Keith Lorenz, Littleton, CO (US); Johannes Alberti, San Ramon, CA (US); Lance Waterman, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 135 days.

(21) Appl. No.: 13/478,185

(22) Filed: May 23, 2012

(65) Prior Publication Data

US 2013/0318192 A1    Nov. 28, 2013

(51) Int. Cl.
*G06F 15/16* (2006.01)

(52) U.S. Cl.
USPC .......................................... 709/213; 707/610

(58) Field of Classification Search
None
See application file for complete search history.

(56) References Cited

U.S. PATENT DOCUMENTS

| | | | |
|---|---|---|---|
| 6,292,835 B1 * | 9/2001 | Huang et al. ................ | 709/235 |
| 6,381,241 B1 | 4/2002 | Ghirnikar et al. | |
| 6,983,293 B2 | 1/2006 | Wang | |
| 7,130,871 B2 | 10/2006 | Acree et al. | |
| 7,467,389 B2 | 12/2008 | Mukkamala et al. | |
| 7,478,170 B2 | 1/2009 | Ong et al. | |
| 7,512,638 B2 | 3/2009 | Jhaveri et al. | |
| 7,539,778 B2 | 5/2009 | Hansmann et al. | |
| 7,606,838 B2 | 10/2009 | Tobies | |
| 7,620,659 B2 | 11/2009 | Novik et al. | |
| 7,660,830 B2 | 2/2010 | Ordille | |
| 7,676,573 B2 | 3/2010 | Herzog et al. | |
| 7,747,567 B2 | 6/2010 | Teegan et al. | |
| 7,778,962 B2 | 8/2010 | Shah et al. | |
| 7,805,420 B2 | 9/2010 | Kapoor et al. | |
| 7,814,483 B2 | 10/2010 | Li et al. | |
| 7,853,561 B2 | 12/2010 | Holenstein et al. | |
| 7,882,062 B2 | 2/2011 | Holenstein et al. | |
| 7,900,142 B2 * | 3/2011 | Baer ........................... | 715/255 |
| 7,962,458 B2 | 6/2011 | Holenstein et al. | |
| 8,037,056 B2 | 10/2011 | Naicken et al. | |
| 8,046,424 B2 | 10/2011 | Novik et al. | |
| 8,086,661 B2 | 12/2011 | Holenstein et al. | |
| 8,131,670 B2 | 3/2012 | Dalfo et al. | |

(Continued)

FOREIGN PATENT DOCUMENTS

| | | |
|---|---|---|
| KR | 2003/0072693 A | 9/2003 |
| KR | 2006/0060629 A | 6/2006 |
| KR | 2011/0074059 A | 6/2011 |

OTHER PUBLICATIONS

Office Communication, dated Sep. 25, 2012, for U.S. Appl. No. 12/813,104, filed Jun. 10, 2010, 14 pages.

(Continued)

*Primary Examiner* — Moustafa M Meky
*Assistant Examiner* — Clayton R Williams
(74) *Attorney, Agent, or Firm* — Sterne, Kessler, Goldstein & Fox P.L.L.C.

(57) ABSTRACT

Methods, systems, and computer program products for synchronizing data between a mobile application and an enterprise data source are provided. A computer-implemented method may include receiving a request for data from an application executing on a mobile device, receiving a document including the requested data from a data source where the document represents a graph of data having a plurality of nodes, and providing a partial graph of data to the application where the partial graph is derived from the received document and at least includes the requested data.

14 Claims, 5 Drawing Sheets

(56) References Cited

U.S. PATENT DOCUMENTS

| | | | |
|---|---|---|---|
| 8,166,101 B2 | 4/2012 | Shah | |
| 8,200,246 B2 | 6/2012 | Khosravy et al. | |
| 8,218,549 B2 | 7/2012 | Dekel et al. | |
| 8,238,696 B2 | 8/2012 | Dart et al. | |
| 8,478,789 B2 | 7/2013 | O'Farrell et al. | |
| 8,527,609 B2 * | 9/2013 | Huang et al. ................. | 709/219 |
| 8,612,380 B2 | 12/2013 | Kleppner et al. | |
| 2003/0110085 A1 | 6/2003 | Murren et al. | |
| 2004/0001498 A1 | 1/2004 | Chen et al. | |
| 2004/0133599 A1 | 7/2004 | Warren et al. | |
| 2004/0133644 A1 | 7/2004 | Warren et al. | |
| 2004/0148420 A1 | 7/2004 | Hinshaw et al. | |
| 2004/0205770 A1 | 10/2004 | Zhang et al. | |
| 2005/0021354 A1 | 1/2005 | Brendle et al. | |
| 2005/0055465 A1 | 3/2005 | Sato | |
| 2005/0055698 A1 | 3/2005 | Sasaki et al. | |
| 2005/0268032 A1 | 12/2005 | Sikdar et al. | |
| 2006/0112398 A1 | 5/2006 | Mukkamala et al. | |
| 2006/0123010 A1 | 6/2006 | Landry et al. | |
| 2007/0073808 A1 | 3/2007 | Berrey et al. | |
| 2007/0099640 A1 | 5/2007 | Khushu et al. | |
| 2007/0100834 A1 | 5/2007 | Landry et al. | |
| 2007/0239725 A1 | 10/2007 | Bhat et al. | |
| 2007/0260475 A1 | 11/2007 | Bhanote | |
| 2007/0260628 A1 | 11/2007 | Fuchs et al. | |
| 2007/0271275 A1 | 11/2007 | Fassette et al. | |
| 2008/0104133 A1 | 5/2008 | Chellappa et al. | |
| 2008/0120304 A1 | 5/2008 | Calio et al. | |
| 2008/0155525 A1 | 6/2008 | Ho | |
| 2008/0176536 A1 | 7/2008 | Galluzzo et al. | |
| 2009/0036102 A1 | 2/2009 | Ho | |
| 2009/0037395 A1 | 2/2009 | Ireland et al. | |
| 2009/0037430 A1 | 2/2009 | Mukkamala et al. | |
| 2009/0059512 A1 | 3/2009 | Lydon et al. | |
| 2009/0171679 A1 | 7/2009 | Salgado et al. | |
| 2009/0177800 A1 | 7/2009 | Gidron et al. | |
| 2009/0187622 A1 | 7/2009 | Xie | |
| 2009/0198722 A1 | 8/2009 | Hanson et al. | |
| 2009/0222402 A1 | 9/2009 | Tysowski | |
| 2009/0247134 A1 * | 10/2009 | Jeide et al. ................. | 455/414.2 |
| 2009/0254601 A1 | 10/2009 | Moeller et al. | |
| 2009/0307284 A1 | 12/2009 | Welingkar et al. | |
| 2010/0011075 A1 | 1/2010 | Klassen et al. | |
| 2010/0030783 A1 | 2/2010 | Ho et al. | |
| 2010/0169451 A1 | 7/2010 | Barry | |
| 2010/0205638 A1 | 8/2010 | Ke | |
| 2011/0154315 A1 | 6/2011 | Singh et al. | |
| 2011/0161290 A1 | 6/2011 | Waterman et al. | |
| 2011/0161339 A1 | 6/2011 | Ireland et al. | |
| 2011/0161349 A1 | 6/2011 | Ireland et al. | |
| 2011/0161383 A1 | 6/2011 | Ho et al. | |
| 2012/0158795 A1 | 6/2012 | Ireland | |
| 2012/0158828 A1 | 6/2012 | Ireland et al. | |
| 2012/0166446 A1 | 6/2012 | Bowman et al. | |
| 2013/0318055 A1 | 11/2013 | Lorenz et al. | |

OTHER PUBLICATIONS

Office Communication, dated Aug. 27, 2012, for U.S. Appl. No. 13/286,372, filed Nov. 1, 2011, 12 pages.

Office Communication, dated Jan. 2, 2013, for U.S. Appl. No. 12/503,573, filed Jul. 15, 2009, 19 pages.

Aboulnaga, A., and Aref, W. G., "Window Query Processing in Linear Quadtrees," in *Distributed and Paralled Databases*, vol. 10, pp. 111-126 (2001).

Aref, W. G. and Samet, H., "Efficient Window Block Retrieval in Quadtree-Based Spatial Databases," in *GeoInformatica*, vol. 1, Chapter 1, pp. 59-91 (Apr. 1997)

Aref, W.G. and Samet, H., "Estimating Selectivity Factors of Spatial Operation," in *Foundations of Models and Languages for Data and Objects*, A. Heuer, & Heuer, & M. H. Scholl edition, pp. 31-43 (Aug. 14, 1993).

Fang, Y. et al., "Spatial Indexing in Microsoft SQL Server 2008," in *Proceedings of the 2008 ACM SIGMOND International Conference on Arrangement of Data*, ACM, New York, NY, pp. 1207-1215 (2008).

Gargantini, I., "An Effective Way to Represnt Quadtrees," in *Communications of the ACM*, vol. 25, No. 12, ACM, New York, NY pp. 905-910 (Dec. 1982).

Kothuri, R. K. V. et al., "Quadtree and R-Tree Indexes in Oracle Spatial: A Comparison using GIS Data," in *Proceedings of the 2002 ACM SIGMOND International Conference on Management of Data*, ACM, New York, NY, pp. 546-557 (2002).

Kriegel, H.-P. et al., "Statistic Driven Acceleration of Object-Relational Space-Partitioning Index Structures," in *Database Systems for Advances Applications*, 14 pages, Jeju Island, Korea, Springer (2004).

Linthicum, Davis S., "Database-Oriented Middleware and EAI," in *Enterprise Application Integration*, Chapter 11, Addison Wesley, pp. 191-208 (May 1, 2000).

Linthicum, David S., "EAI Moving Forward," in *Enterprise Application Integration*, Chapter 20, Addison Wesley, pp. 339-349 (May 1, 2000).

Orenstein, J. A., "Redundancy in Spatial Databases," in *Proceedings of the 1989 ACM SIGMOND International Conference on Management of Data*, ACM, New York, NY, pp. 294-305 (1989).

Samet, H., *Foundations of Multidimensional and Metric Data Structures*, Morgan Kaufmann, pp. 28-48, 191-193, 204-205, and 211-220 (2006).

Sinitsyn A., "A Synchronization Framework for Personal Mobile Servers," *Proceedings of the IEEE Annual Conference on Pervasive Computing and Communications*, pp. 1-5, Mar. 14-17, 2004.

English Language Abstract for Korean Patent Publication No. 2003/0072693 A, published Sep. 19, 2003, European Patent Office, Espacenet Database, http://worldwide.espacenet.com, 1 page (listed as document FP1on the accompanying form PTO/SB/08a.

English Language Abstract for Korean Patent Publication No. 2006/0060629 A, published Jun. 5, 2006, Eurpoean Patent Office, Espacenet Database, http://worldwide.espacenet.com, 1 page (listed as document FP2on the accompanying form PTO/SB/08a).

English Language Abstact for Korean Patent Publication No. 2011/0074059 A, published Jun. 30, 2011, European Patent Office, Espacenet Database, http://worldwide.espacenet.com 1 page (listed as document FP3on the accompanying form PTO/SB/08a).

Extended European Search Report for European Patent Application No. PCT/US2009/004343, dated Sep. 27, 2011, 6 pages.

International Search Report and Written Opinion for International Application No. PCT/US2009/004343, dated Mar. 18, 2010, 11 pages.

International Search Report and Written Opinion for International Application No. PCT/US2010/060290, dated Jul. 28, 2011, 10 pages.

International Search Report and Written Opinion for International Application No. PCT/US2010/060293, dated Aug. 2, 2011, 11 pages.

International Search Report and Written Opinion for International Application No. PCT/US2010/060296, dated Aug. 5, 2011, 9 pages.

International Search Report and Written Opinion for International Application No. PCT/US2011/065197, dated May 29, 2012, 9 pages.

Office Action mailed Apr. 25, 2012 in U.S. Appl. No. 12/503,573, Ho et al., filed Jul. 15, 2009, 14 pages.

Office Action mailed Sep. 19, 2011 in U.S. Appl. No. 12/503,573, Ho et al., filed Jul. 15, 2009, 13 pages.

Office Action mailed Jan. 3, 2012 in U.S. Appl. No. 12/760,233, Waterman et al., filed Apr. 14, 2010, 8 pages.

Office Action mailed Jul. 3, 2012 in U.S. Appl. No. 12/760,233, Waterman et al., filed Apr. 14, 2010, 9 pages.

Office Action mailed Apr. 11, 2012 in U.S. Appl. No. 12/813,104, Ireland et al., filed Jun. 10, 2010, 16 pages.

Office Action mailed Aug. 10, 2012 in U.S. Appl. No. 12/649,527, Ho et al., filed Dec. 30, 2009, 12 pages.

Office Action, mailed Mar. 7, 2012 in U.S. Appl. No. 12/797,975, Ireland et al., filed Jun. 10, 2010, 8 pages.

Office Action, mailed Jun. 27, 2012 in U.S. Appl. No. 12/797,975, Ireland et al., filed Jun. 10, 2010, 9 pages.

U.S. Appl. No. 13/478,181, Lorenz et al., filed May 23, 2012, entitled "Cache Conflict Detection".

Extended European Search Report, dated Sep. 27, 2011, for European Patent Appl. No. 09803252.7, 6 pages.

(56) References Cited

OTHER PUBLICATIONS

Office Action mailed Nov. 20, 2012 in U.S. Appl. No. 12/760,233, Waterman et al., filed Apr. 14, 2010, 15 pages.
Office Action mailed May 2, 2013 in U.S. Appl. No. 12/760,233, Waterman et al., filed Apr. 14, 2010, 12 pages.
Final Office Action mailed Jun. 10, 2013 in U.S. Appl. No. 12/503,573, Ho et al., filed Jul. 15, 2009, 14 pages.
Office Action mailed Sep. 23, 2013 in U.S. Appl. No. 12/760,233, Waterman et al., filed Apr. 14, 2010, 10 pages.
Office Action mailed Oct. 1, 2013 in U.S. Appl. No. 12/503,573, Ho et al., filed Jul. 15, 2009, 13 pages.
Office Action mailed Mar. 6, 2014 in U.S. Appl. No. 13/478,181, Lorenz, et al., filed May 23, 2012, 12 pages.
Notice of Allowance mailed Mar. 10, 2014 in U.S. Appl. No. 12/760,233, Waterman, et al., filed Apr. 14, 2010, 8 pages.
Final Office Action mailed May 21, 2014 in U.S. Appl. No. 12/503,573, Ho et al., filed Jul. 15, 2009, 15 pages.
Notification of Transmittal of the International Search Report and the Written Opinion for International Application No. PCT/US2013/042356, dated Sep. 6, 2013, 10 pages.

* cited by examiner

COMPOSITE GRAPH CACHE MANAGEMENT

BACKGROUND OF THE INVENTION

1. Field of the Invention

Embodiments generally relate to the field of mobility.

2. Background Art

Data owners are often concerned about shielding their data sources from unwanted or unexpected data requests. In particular, a data source that services a mobile application should not be exposed to an unpredictable amount of data requests from the mobile application.

Conventionally, mobile applications directly access data sources (e.g., enterprise data sources) to retrieve data. Because a plurality of mobile applications can make concurrent requests for data at different times, it often leads to an unexpected load on the data sources. Furthermore, because enterprise data typically exists in disparate formats at geographically distributed locations, servicing data requests received from the mobile applications can be a resource intensive process.

Accordingly, systems, methods and computer program products are needed that efficiently respond to mobile application data requests while shielding data sources from being negatively impacted by such requests.

BRIEF SUMMARY OF THE INVENTION

Embodiments relate to data synchronization between a mobile application and an enterprise data source. In one embodiment, a computer-implemented method for synchronizing data between a mobile application and an enterprise data source includes receiving a request for data from an application executing on a mobile device, receiving a document including the requested data from a data source where the document represents a graph of data having a plurality of nodes, and providing a partial graph of data to the application where the partial graph is derived from the received document and at least includes the requested data.

In another embodiment, a server-based system for synchronizing data between a mobile application and an enterprise data source includes a caching module configured to receive a request for data from an application executing on a mobile device, receive a document including the requested data from a data source where the document represents a graph of data having a plurality of nodes, and provide a partial graph of data to the application where the partial graph is derived from the received document and at least includes the requested data.

In an additional embodiment, a computer-readable storage device has control logic recorded thereon that when executed by a processor, causes the processor to synchronize data between a mobile application and an enterprise data source. The control logic includes computer-readable program code to cause the processor to receive a request for data from an application executing on a mobile device, receive a document including the requested data from a data source where the document represents a graph of data having a plurality of nodes, and provide a partial graph of data to the application where the partial graph is derived from the received document and at least includes the requested data.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the embodiments and to enable a person skilled in the relevant art(s) to make and use the embodiments.

Figure 1:
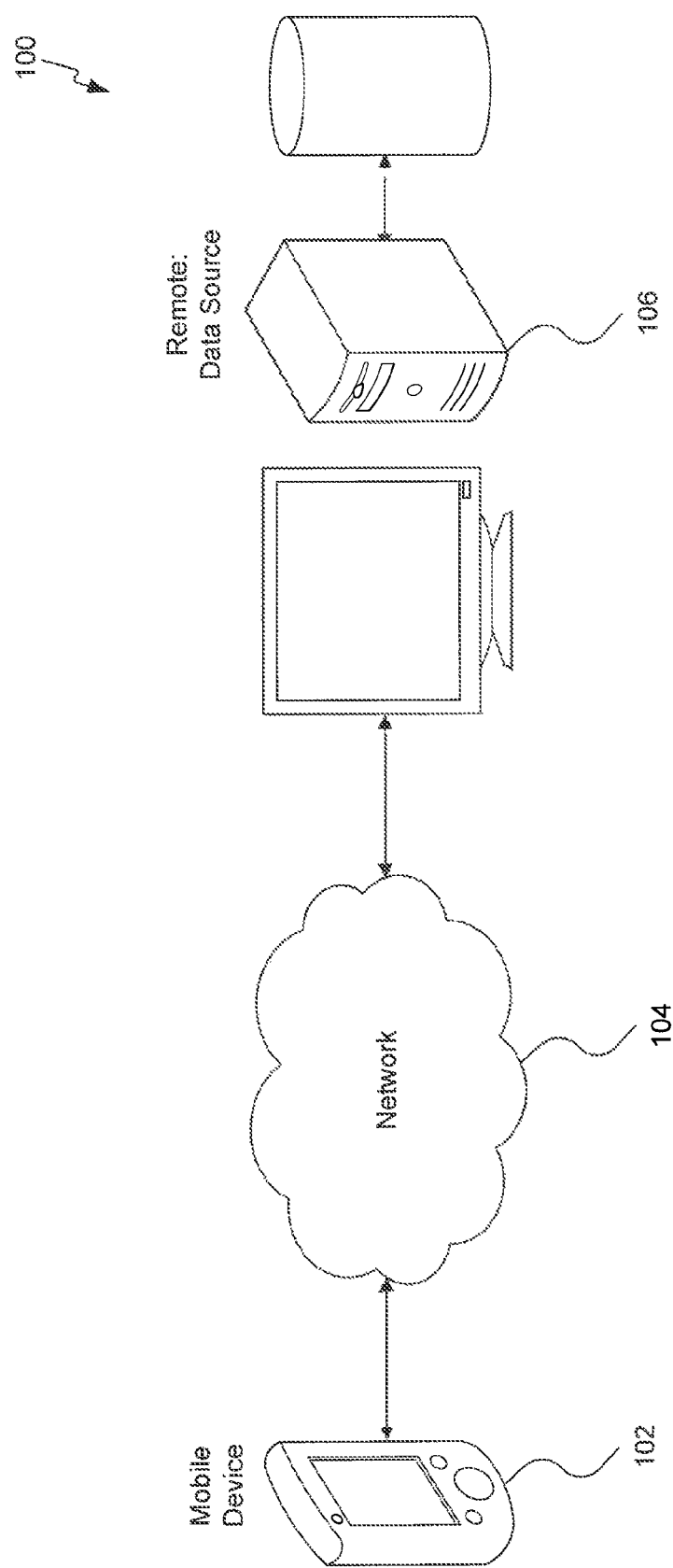
FIG. 1 is an exemplary network architecture in which embodiments of the present invention, or portions thereof, can be implemented.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which embodiments of the invention would be of significant utility.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic with other embodiments whether or not explicitly described.

Various embodiments include methods, systems, and computer program products for synchronizing data between a mobile application and an enterprise data source. Embodiments may be independently implemented or incorporated as features in other systems, such as systems that provide data caching for mobile applications. An example system is described in greater detail in U.S. patent application Ser. No. 12/760,233, filed on Apr. 14, 2010, entitled "Data Caching for Mobile Applications," which is incorporated by reference herein in its entirety.

Overview

Mobile clients request and use information from a variety of enterprise data sources. Mobile applications enable mobile clients to create, modify, and otherwise access enterprise data, which may be stored and accessed as documents, objects, or other forms of structured data. Further, data created or updated by a mobile client, whether connected or offline, needs to be synchronized with the system of record. The embodiments described herein enable mobile clients to efficiently retrieve and update enterprise data using partial datasets.

For example, in an embodiment, a mobile client requests data from an enterprise data source using a mobile application. The request is received by middleware configured to communicate partial documents and change sets with mobile clients while providing full document support for enterprise data sources. The middleware is also configured to cache full documents and other data structures locally. The centrally cached documents may be used to service requests for data from other mobile clients and to help reduce the overall number of requests made to enterprise data sources.

Next, in an embodiment, the middleware searches its local cache for a copy of the document containing the requested data. The middleware then queries the enterprise data source when the data is not available locally. The middleware requests the full document (e.g., XML, JSON, iDoc, etc.) containing the enterprise data requested by the mobile client. However, even though the backend system of record (e.g., SAP, DBMS, etc.) manages the information as a business document, business object, or other unit of work, the mobile client only needs a subset or partial set of this data.

In an embodiment, the middleware prepares and returns a partial set of data to the mobile client in response to the initial request. The mobile client then may create new data or modify existing data associated with this partial dataset using a mobile application. Further, one or more modified versions of the data may be created while the mobile client is either online or offline.

Next, in an embodiment, the middleware receives a modified version of the partial set of data from the mobile device. The middleware then determines the operations that were performed to produce the modified version by comparing the modified version to corresponding data in the original document. The middleware creates a new version of the document to reflect the changes that were made to the partial dataset, and provides the new version to the enterprise data source.

In an embodiment, the middleware serves as an intermediary between the mobile client and the enterprise server. The middleware is configured to communicate with enterprise data sources using full business documents, business objects, and other units of work. The middleware is also configured to exchange partial datasets or subsets of full documents with various types of clients. Thus, the middleware provides efficient interaction between mobile clients and enterprise data sources while ensuring that full sets of enterprise data are consistent and valid.

Example Network Architecture

FIG. 1 is an example network architecture 100 in which embodiments of the present invention, or portions thereof, are implemented. Network architecture 100 includes a mobile device 102 connected using network 104 to server 106, in accordance with an embodiment of the present invention. In accordance with another embodiment of the present invention, a software application is deployed on mobile device 102. The software application is written to occasionally retrieve data from server 106. When the software application attempts to retrieve data from server 106, network 104 may or may not be available. Embodiments described herein refer to mobile devices, such as mobile device 102. However, it should be understood that this is not intended to be limiting and that other embodiments may include any computing device connected over a network 104 to a server.

For example, according to an embodiment, mobile device 102 may be any computing device designed for personal use by a user or integrated with other computer systems or computing devices for use by an end-user. For example, mobile device 102 may include any computing device such as a desktop computer, laptop, tablet, smartphone, gaming system, navigation device, portable media player, mobile device, electronic device, and computing devices embedded into other systems including, for example, automobiles and appliances. Mobile device 102 may also include any other type of computer system having at least one processor and memory.

Network 104 can be any network or combination of networks that can carry data communications. Such a network can include, but is not limited to, a wired (e.g., Ethernet) or a wireless (e.g., Wi-Fi and 4G) network. In addition, the network may include, but is not limited to, a local area network, and/or wide area network such as the Internet. The network can support protocols and technology including, but not limited to, Internet or World Wide Web protocols and/or services. Intermediate network routers, gateways, or servers may be provided between servers and clients depending on a particular application or environment.

Server 106 and any combination of its components, may be part of, or may be implemented using, one or more computing devices. Such server-based computing devices may include, but are not limited to, one or more standalone servers, distributed computing systems, clustered computer systems, cloud computing systems, and grid computing systems.

Example Framework

Figure 2:
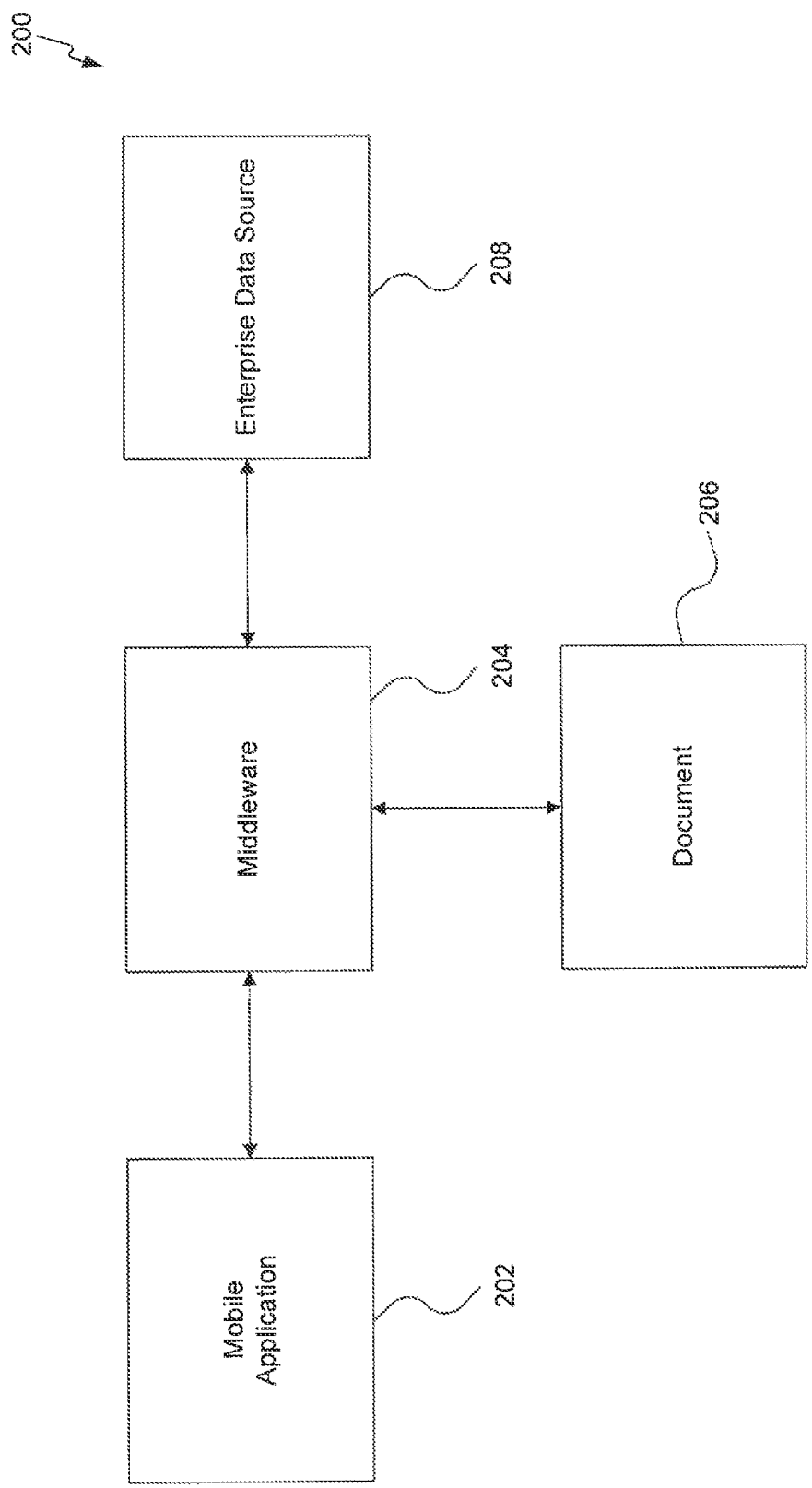
FIG. 2 is an example system framework, according to an embodiment.

FIG. 2 is an example framework 200, in accordance with an embodiment of the present invention. Framework 200 defines a mobile application 202, middleware 204, document 206, and enterprise data source 208, in accordance with an embodiment of the present invention. One skilled in the relevant arts will appreciate that the arrangement shown in framework 200 is presented by way of example, and not limitation. In accordance with an embodiment of the present invention, mobile application 202 is operable to execute on mobile device 102. In accordance with a further embodiment of the present invention, enterprise data source 208 is equivalent to server 106.

Mobile application 202 accesses data from enterprise data source 208 by making calls to an API or other interface provided by middleware 204, in accordance with an embodiment of the present invention. In accordance with an embodiment of the present invention, middleware 204 is the iAnywhere Mobilink, iMO and SUP middleware provided by Sybase, Inc. of Dublin, Calif.

One skilled in the relevant arts will appreciate that enterprise data source 208 may be any number of types of data sources, including, for example, a relational database or a remote procedure. Middleware 204 facilitates communications, through the use of its API, by an application to one or more data sources, such as enterprise data source 208.

Document 206 is a representation of data, in any form and type, contained in enterprise data source 208, in accordance with an embodiment of the present invention. For example, many data sources, enterprise applications, and systems of record have the ability to manage data as a graph, an XML document, a JSON document, an iDoc, or another specific representation of data. For example, a system of record may contain an order having specific line items, which reference product information. Such information can be represented as a graph of data with a plurality of nodes and may be contained within a single business document.

According to an embodiment, document 206 may represent multiple data sources (e.g., document 206 may comprise subsets of data from multiple data sources). According to another embodiment, document 206 may include metadata, which may be interpreted by the software of mobile application 202 to facilitate access of the data from enterprise data source 208 through middleware 204.

In an embodiment, not intended to limit the invention, enterprise data source 208 provides access to enterprise resources. As an example, enterprise resources (ERs) include, but are not limited to, database management systems (DBMS), SAP enterprise systems, web services, data files, hypertext transfer protocol (HTTP) systems and even spreadsheets. In addition, and according to another embodiment, third parties (e.g., customers, software vendors, etc.) may extend functionality of enterprise data source 208 to include, for example, integration with additional data sources (not shown).

Figure 3:
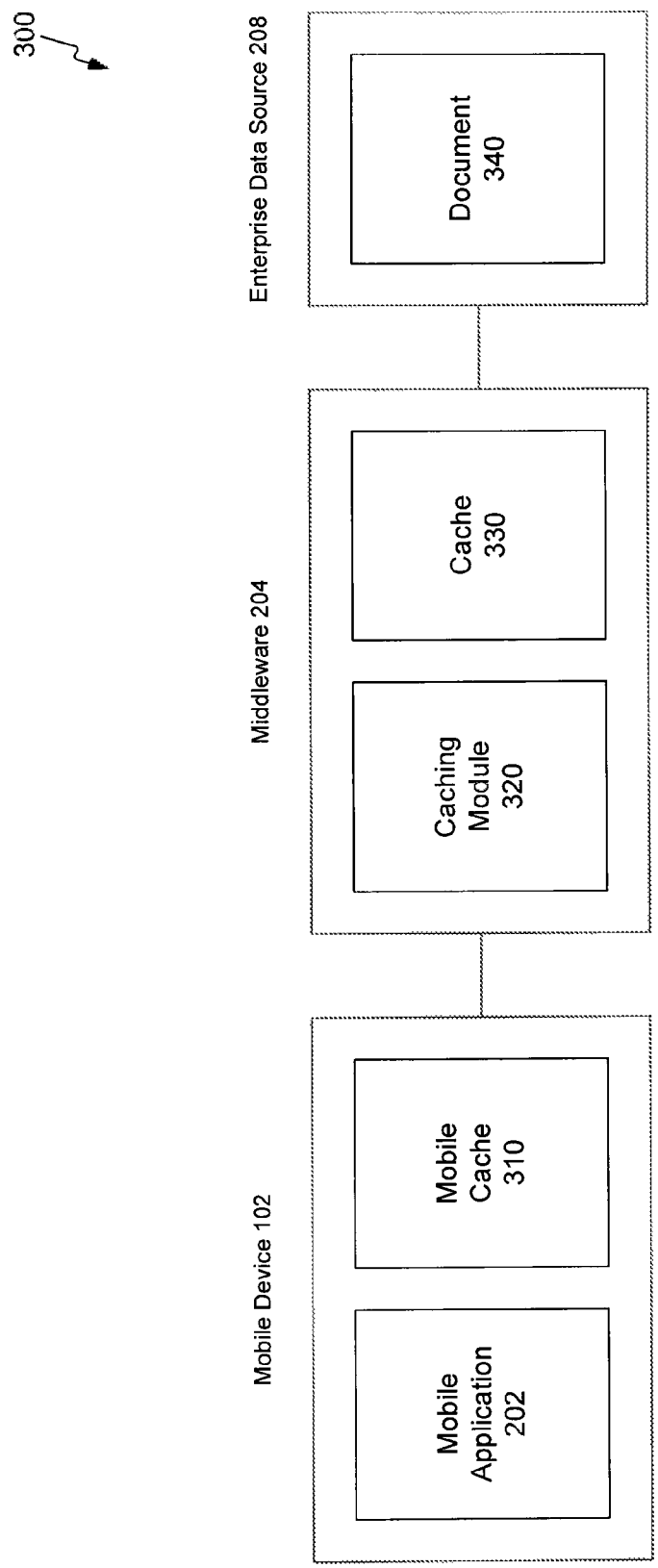
FIG. 3 is a diagram illustrating a system for synchronizing data between a mobile application and an enterprise data source, according to an embodiment.

System for Synchronizing Data between a Mobile Application and an Enterprise Data Source FIG. 3 is a diagram illustrating a system 300 for synchronizing data between a mobile application and an enterprise data source. System 300 includes mobile device 102, middleware 204 and enterprise data source 208.

According to an embodiment, mobile device 102 is an occasionally connected computing device that executes at least one mobile application 202. Additionally, mobile device 102 includes mobile cache 310. In an embodiment, mobile cache 310 may be used to receive and store numerous sets of data, some or all of them being partial sets of data, which mobile device 102 receives from middleware 204. Further, mobile cache 310 may store modified versions of datasets (partial or full) created by an offline mobile device 102 that middleware 204 will later use to update enterprise data source 208.

According to another embodiment, the modified versions of datasets may be stored in mobile cache 310 while mobile device is not connected to a network. Mobile application 202 may be configured to synchronize one or more versions of the datasets with middleware 204 when mobile device 102 reconnects to a network. In an alternative embodiment, one or more modified version of enterprise data may be pushed to middleware 204 or pulled by middleware 204 on a scheduled or unscheduled basis.

Middleware 204 includes caching module 320 and cache 330. In an embodiment, middleware 204 acts as an interface between mobile application 202 and enterprise data source 208. For example, middleware 204 may be configured to allow clients to access enterprise data in partial datasets without having to transport an entire document or dataset between mobile device 102 and enterprise data server 208. Thus, middleware 204 may manage the state of the document or full dataset on behalf of mobile device 102, which may only be concerned with partial sets of data.

In another embodiment, middleware 204 reduces unwanted or unexpected loads (e.g., unpredictable data requests) on enterprise data source 208 using caching module 320 and cache 330. In particular, according to an embodiment, middleware 204 services mobile application data requests using caching module 320 and cache 330. Thus, at times, mobile application 202 need not invoke direct requests on enterprise data source 208 or any other backend enterprise information systems. In this way, embodiments of the present invention efficiently service mobile application data requests while shielding data sources from being negatively impacted or overloaded by the requests.

Enterprise data source 208 includes document 340. Enterprise data source 208 may represent one or more data sources that exist within an enterprise environment. For example, enterprise data source 208 may include, but is not limited to, database management systems (DBMS), data warehouses, SAP enterprise systems, custom software applications, web services, data files, hypertext transfer protocol (HTTP) systems and also spreadsheets. In an embodiment, enterprise data source 208 manages data using one or more of a graph, an XML document, a JSON document, an iDoc, or other types of data collections. Document 340 represents a collection of data.

In another embodiment, mobile application 202 requests data from enterprise data source 208. Caching module 320 receives the request and makes a corresponding request to enterprise data source 208 on behalf of mobile device 102. Enterprise data source 208 provides document 340 to caching module 320, which then places document 340 in cache 330. Caching module 320 identifies the partial set of data requested by mobile application 202 existing in document 340. Caching module 320 then responds to mobile application 202 by providing the partial dataset.

In a further embodiment, mobile application 202 is used to create a new version of the partial dataset while mobile device 102 is offline. The new version of the partial dataset is stored in mobile cache 310 until mobile device 102 is able to reconnect to middleware 204. Once caching module 320 receives the new version of the partial dataset, it determines the operations that were performed to produce the modified version, it creates a new version of document 340 based on the determined operations, and it then provides the new version of document 340 to enterprise data source 208.

Figure 4:
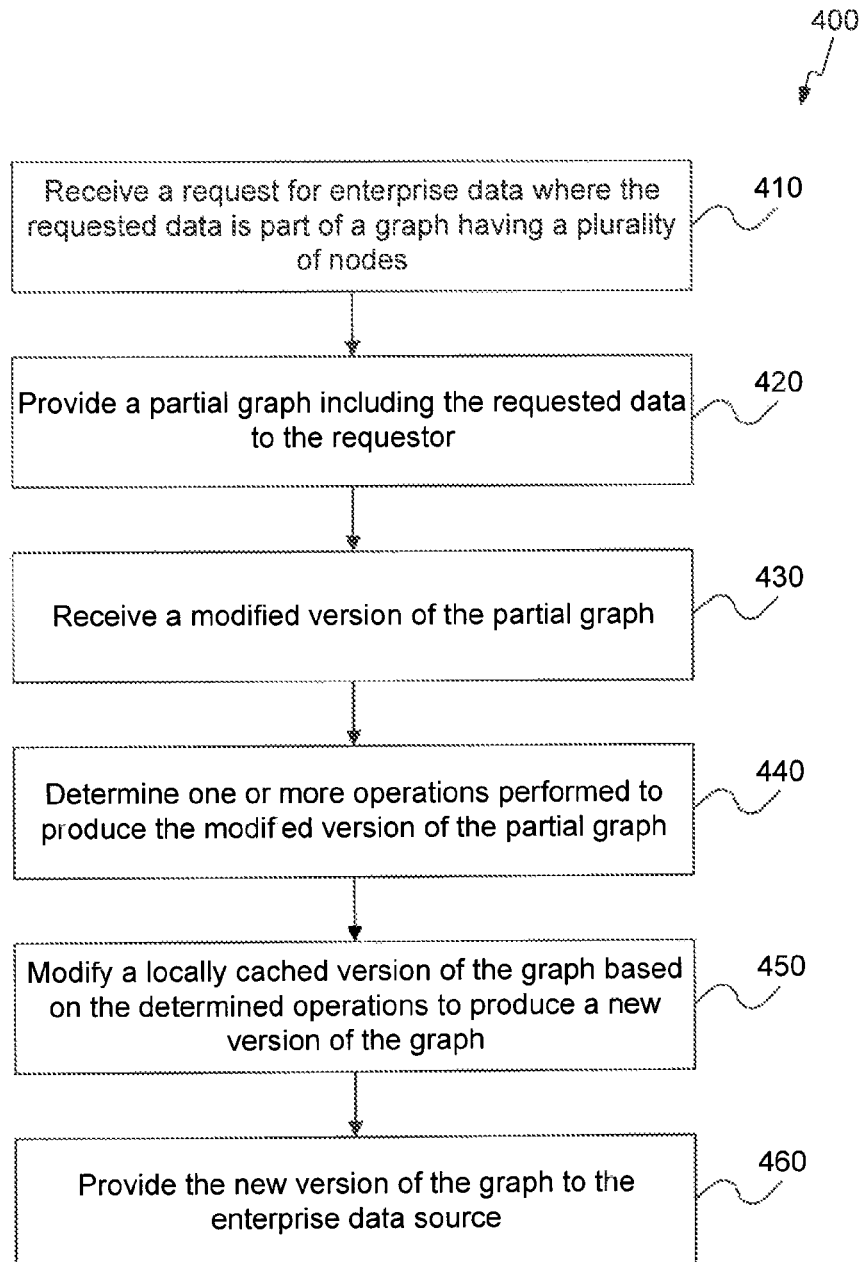
FIG. 4 is a flow diagram of a method for synchronizing data between a mobile application and an enterprise data source, according to an embodiment.

Method for Synchronizing Data between a Mobile Application and an Enterprise Data Source FIG. 4 is a flow diagram of a method 400 for synchronizing data between a mobile application and an enterprise data source, according to an embodiment.

Method 400 begins at step 410, when a request for data is received from an application executing on an occasionally connected mobile device. According to an embodiment, mobile application 202 requests data from an enterprise data source 208, which has the ability to manage data as a document capable of being represented as a graph having a plurality of nodes.

In an embodiment, mobile application 202 is configured to send requests for enterprise data to middleware 204. For example, mobile application 202 may be configure to send data requests to caching module 320 using an Application Programming Interface (API), which may include a REST-based or other type of web service.

In an embodiment, caching module 320 receives a request from mobile application 202 for data residing on enterprise data source 208. Caching module 320 may first search cache 330 to determine whether the requested data is available locally. For example, caching module may have stored data previously requested by one or more mobile clients in cache 330. Caching module 320 may then service the request using a cached version of the data available in cache 330, instead of requesting the data from enterprise data source 208.

In some embodiments, clients and systems may access enterprise data source 208 either directly or using one or more systems other than middleware 204. In these scenarios, a version of a document stored in cache 330 could become stale. Thus, caching module 320 may also be configured to synchronize a version of a document in local cache 330 with a newer version from enterprise data source to avoid providing mobile device 102 with outdated data. For example, caching module 320 may perform a check periodically or based on a request to determine whether a newer version of a cached document is available from enterprise data source 208.

In these scenarios, partial or full datasets stored in mobile cache 310 or on mobile device 102 may also become outdated. Such scenarios are further discussed along with systems and methods for providing cache conflict detection and resolution in co-pending U.S. patent application Ser. No. 13/478,181, filed May 23, 2012, entitled CACHE CONFLICT DETECTION, incorporated herein by reference in its entirety, although the invention is not limited to these teachings.

In another embodiment, caching module 320 determines that the data requested by mobile application 202 is not available in cache 330. Caching module 320 then requests and receives the data from enterprise data source 208. For example, the requested data may include document 340.

According to an embodiment, caching module 320 may persist, for some time period, data, result sets, objects, and documents, such as document 340, in cache 330. Thus, a subsequent requestor, either the same or another mobile device, can benefit from data previously stored within cache 330, helping to reduce the overall number of requests made to enterprise data source 208.

At step 420, a partial graph of data including at least the requested data is provided to mobile application 202. In an embodiment, caching module 320 provides mobile application 202 with a partial set of data from a larger dataset (e.g., document 340), which originated from enterprise data source 208.

For example, a mobile application may request data associated with a single service ticket. However, enterprise data source 208 may store or provide the requested service ticket data with other information, such as related service tickets by date or by user. Caching module 320 is configured to provide a partial dataset that includes the requested data to mobile application 202.

According to another embodiment, mobile application 202 receives the partial dataset and may store its own local copy in mobile cache 310. Mobile application 202 then modifies the partial dataset while mobile device 102 is either online or offline. For example, when mobile device 102 is offline, one or more modified versions of the partial dataset may be stored in mobile cache 310 until mobile device 102 is able to reconnect to middleware 204.

At step 430, a modified version of the partial graph is received from the mobile application. In an embodiment, caching module 320 receives one or more modified versions of the partial graph stored in mobile cache 310.

According to an embodiment, mobile application 202 may be used to create, update and delete data associated with a partial dataset, thus creating a modified version of the partial dataset. One or more modified versions of the partial dataset then may be stored in mobile cache 310 and then later communicated to middleware 204 for graph merge processing with an associated document or dataset.

At step 440, the operations that were performed to produce the modified version of the partial graph are determined. According to an embodiment, caching module 320 determines one or more operations that were performed on the partial dataset by mobile application 202. For example, caching module 320 can derive the delta or the operations performed against the partial dataset on mobile device 102 by comparing the modified version of the dataset with an earlier version of the partial dataset or the full version of the document from which the partial dataset originated.

At step 450, a locally cached version of the graph is modified, based on the determined operations that were performed on the partial graph, producing a new version of the graph. In an embodiment, caching module 320 modifies a cached version of document 340 available in cache 330 based on the one or more operations that were determined to be performed to create the modified partial dataset. For example, caching module 320 performs graph merge processing to incorporate the changes introduced by the partial dataset into the original document. Thus, caching module 320 synchronizes document 340 with the changes that were made to the corresponding partial dataset, producing a new version of document 340.

At step 460, the new version of the graph is provided to the enterprise data source. According to an embodiment, caching module 320 provides the new version of document 340 to enterprise data source 208. Thus, caching module 320 completes the changes made to the partial dataset by providing a full, new version of document 340 to enterprise data source 208.

Example Computer System

Figure 5:
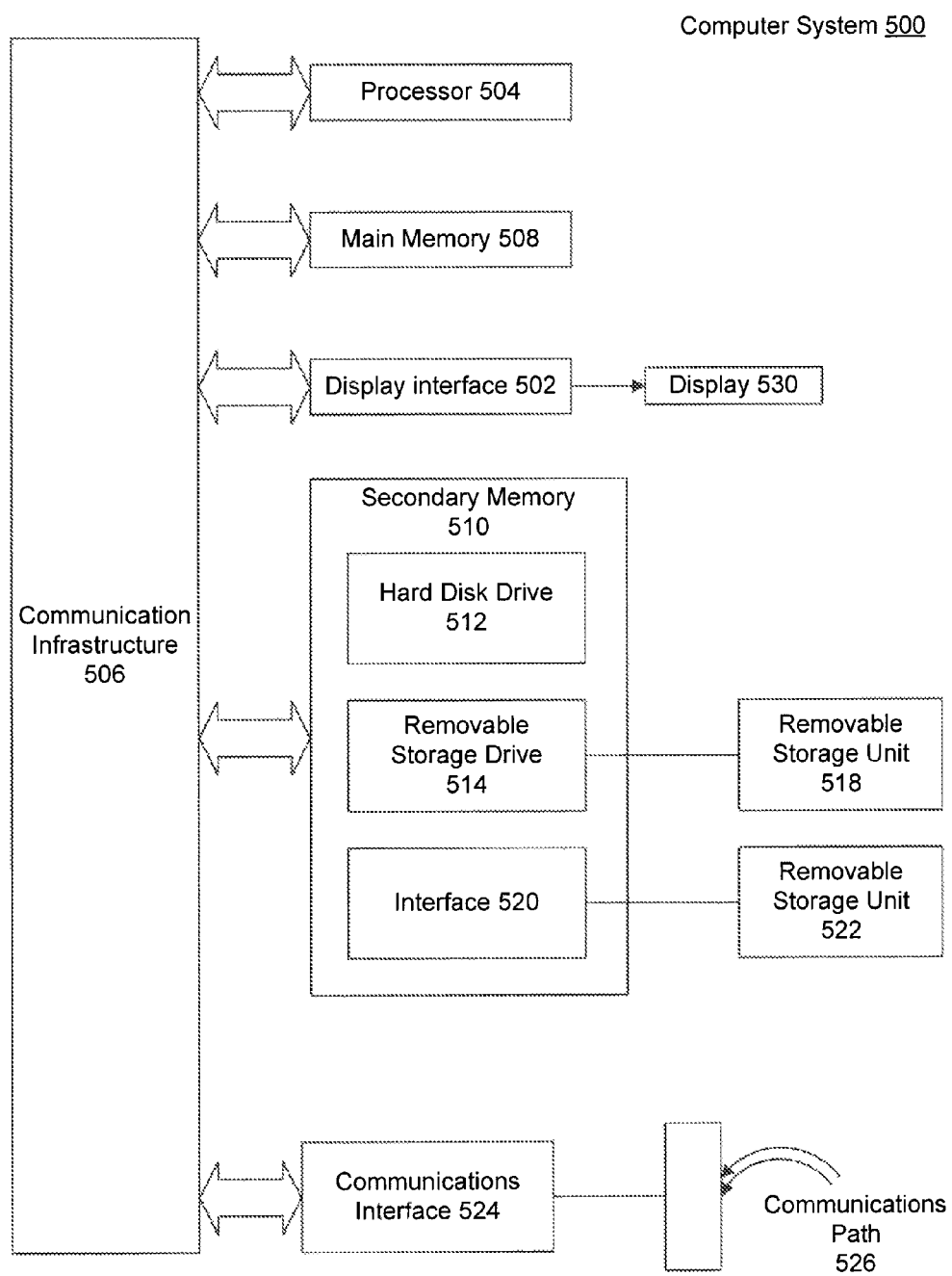
FIG. 5 is a diagram of an exemplary computer system that may be used in an embodiment.

In an embodiment, the system and components of embodiments described herein are implemented using well-known computers, such as example computer system 500 shown in FIG. 5. For example, system 300 and other embodiments for synchronizing data between a mobile application and an enterprise data source may be implemented using one or more computer systems 500.

Computer system 500 includes one or more processors (also called central processing units, or CPUs), such as a processor 504. Processor 504 is connected to a communication infrastructure 506.

Computer system 500 also includes a main or primary memory 508, such as random access memory (RAM). Main memory 508 has stored control logic (computer software), and data.

Computer system 500 may also include one or more secondary storage devices 510. Secondary storage device 510 includes, for example, a hard disk drive 512 and/or a removable storage device or drive 514, as well as other types of storage devices, such as memory cards and memory sticks. Removable storage drive 514 represents a floppy disk drive, a magnetic tape drive, a compact disk drive, an optical storage device, tape backup, etc.

Removable storage drive 514 may interact with a removable storage unit 518. Removable storage unit 518 includes a computer usable or readable storage device having stored thereon computer software (control logic) and/or data. Removable storage unit 518 represents a floppy disk, magnetic tape, compact disk, DVD, optical storage disk, or any other computer data storage device. Removable storage drive 514 may read from and/or write to removable storage unit 518 in a well-known manner.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 also includes input/output/display devices 530, such as monitors, keyboards, pointing devices, etc., which communicate with communication infrastructure 506 through a display interface 502.

Computer system 500 further includes a communication or network interface 524. Communication interface 524 may enable computer system 500 to communicate with remote devices. For example, communication interface 524 may allow computer system 500 to communicate over communications path 526, such as LANs, WANs, the Internet, etc. Communications interface 524 may interface with remote sites or networks via wired or wireless connections.

Control logic may be transmitted to and from computer system 500 via communication path 526.

Any tangible apparatus or article of manufacture comprising a computer useable or readable medium having control logic (software) stored thereon is referred to herein as a computer program product or program storage device. This includes, but is not limited to, computer system 500, main memory 508, secondary storage device 510, and removable storage unit 518. Such computer program products, having control logic stored thereon that, when executed by one or more data processing devices, causes such data processing devices to operate as described herein, represent embodiments of the invention.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described embodiments.

In addition, the foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for synchronizing data between a mobile application and an enterprise data source, comprising:

receiving a request for data from the mobile application executing on a mobile device;

receiving a document including the requested data from the enterprise data source, wherein the document represents a graph of data having a plurality of nodes;

providing a partial graph of data to the mobile application, wherein the partial graph is derived from the received document and includes the requested data;

receiving a modified partial graph from the mobile application;

determining one or more operations performed to create the modified partial graph based on a comparison of the received modified partial graph and the provided partial graph of data;

modifying the document in a local cache based on the determined operations to create a new version of the document; and providing the new version of the document to the enterprise data source, wherein the new version includes one or more changes introduced by the modified partial graph.

2. The method of claim 1, further comprising:

requesting the data from the enterprise data source on behalf of the mobile application.

3. The method of claim 2, further comprising:

determining whether the received document exists in the local cache.

4. The method of claim 3, further comprising:

persisting the received document in the local cache based on a determination that the received document does not exist in the local cache.

5. The method of claim 3, further comprising:

replacing an existing document in the local cache with the received document based on a determination that the received document is a more recent version.

6. A server-based system for synchronizing data between a mobile application and an enterprise data source, comprising:

a caching module, implemented on a processor operatively coupled to a memory, configured to:

receive a request for data from the mobile application executing on a mobile device;

receive a document including the requested data from the enterprise data source, wherein the document represents a graph of data having a plurality of nodes;

provide a partial graph of data to the mobile application, wherein the partial graph is derived from the received document and includes the requested data;

receive a modified partial graph from the mobile application;

determine one or more operations performed to create the modified partial graph based on a comparison of the received modified partial graph and the provided partial graph of data;

modify the document in a local cache based on the determined operations to create a new version of the document; and provide the new version of the document to the enterprise data source, wherein the new version includes one or more changes introduced by the modified partial graph.

7. The system of claim 6, wherein the caching module is further configured to:

request the data from the enterprise data source on behalf of the mobile application.

8. The system of claim 7, wherein the caching module is further configured to:

determine whether the received document exists in the local cache.

9. The system of claim 8, wherein the caching module is further configured to:
- persist the received document in the local cache based on a determination that the received document does not exist in the local cache.

10. The system of claim 8, wherein the caching module is further configured to:
- replace an existing document in the local cache with the received document based on a determination that the received document is a more recent version.

11. A non-transitory computer-readable storage medium having control logic recorded thereon that, when executed by a processor, causes the processor to perform operations to synchronize data between a mobile application and an enterprise data source, the operations comprising:
- receiving a request for data from the mobile application executing on a mobile device;
- receiving a document including the requested data from the enterprise data source, wherein the document represents a graph of data having a plurality of nodes; and
- providing a partial graph of data to the mobile application, wherein the partial graph is derived from the received document and includes the requested data;
- receiving a modified partial graph from the mobile application;
- determining one or more operations performed to create the modified partial graph based on a comparison of the received modified partial graph and the provided partial graph of data;
- modifying the document in a local cache based on the determined operations to create a new version of the document; and
- providing the new version of the document to the enterprise data source, wherein the new version includes one or more changes introduced by the modified partial graph.

12. The computer-readable storage medium of claim 11, the operations further comprising:
- requesting the data from the enterprise data source on behalf of the mobile application.

13. The computer-readable storage medium of claim 12, the operations further comprising:
- determining whether the received document exists in the local cache.

14. The computer-readable storage medium of claim 13, the operations further comprising:
- persisting the received document in the local cache based on a determination that the received document does not exist in the local cache.

* * * * *